United States Patent
Kim et al.

(10) Patent No.: US 9,863,504 B2
(45) Date of Patent: Jan. 9, 2018

(54) PLANETARY GEAR TRAIN OF AUTOMATIC TRANSMISSION FOR VEHICLE

(71) Applicant: HYUNDAI MOTOR COMPANY, Seoul (KR)

(72) Inventors: Jong Soo Kim, Seoul (KR); Jinseok Kim, Seoul (KR); Jae Chang Kook, Hwaseong-si (KR); Dong Hwan Hwang, Seoul (KR); Seong Wook Hwang, Gunpo-si (KR); Woo Jin Chang, Suwon-si (KR); Seongwook Ji, Ansan-si (KR); Chon Ok Kim, Yongin-si (KR); Wonmin Cho, Hwaseong-si (KR); Hyun Sik Kwon, Seoul (KR); Jong Sool Park, Hwaseong-si (KR); Kyeong Hun Lee, Seoul (KR); Tae Whan Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/078,606

(22) Filed: Mar. 23, 2016

(65) Prior Publication Data
US 2017/0261073 A1 Sep. 14, 2017

(30) Foreign Application Priority Data
Mar. 9, 2016 (KR) .................. 10-2016-0028482

(51) Int. Cl.
*F16H 3/62* (2006.01)
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2048* (2013.01)

(58) Field of Classification Search
CPC .............. F16H 3/62; F16H 2200/0069; F16H 2200/2012; F16H 2200/2048
See application file for complete search history.

(56) References Cited

U.S. PATENT DOCUMENTS

| | | | |
|---|---|---|---|
| 8,870,705 B2 | 10/2014 | Diemer et al. | |
| 9,188,200 B2 | 11/2015 | Knox | |
| 2006/0166779 A1* | 7/2006 | Klemen | F16H 3/66 475/280 |
| 2010/0144486 A1* | 6/2010 | Hart | F16H 3/66 475/275 |

FOREIGN PATENT DOCUMENTS

| | | |
|---|---|---|
| KR | 10-2012-0119451 A | 10/2012 |
| KR | 10-1394033 B1 | 5/2014 |

* cited by examiner

*Primary Examiner* — Huan Le
(74) *Attorney, Agent, or Firm* — Brinks Gilson & Lione

(57) ABSTRACT

The present disclosure provides a planetary gear train of an automatic transmission for a vehicle. The planetary gear train may include: an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements.

10 Claims, 2 Drawing Sheets

FIG. 2

| Speed Stage | Control element ||||||| Gear Ratio | Step Ratio | Note |
|---|---|---|---|---|---|---|---|---|---|---|
| | B1 | B2 | B3 | C1 | C2 | C3 | C4 | | | |
| D1 | ● | | | | ● | | ● | 4.80 | - | Gear ratio span : 10.01 |
| D2 | ● | | | | ● | ● | | 3.13 | 1.53 | |
| D3 | ● | ● | | | ● | | | 2.12 | 1.48 | |
| D4 | ● | | | ● | ● | | | 1.54 | 1.38 | |
| D5 | | ● | | ● | | | | 1.19 | 1.29 | Ratio of REV/D1 : 1.04 |
| D6 | | | | ● | ● | ● | | 1.00 | 1.19 | |
| D7 | | ● | | ● | ● | | | 0.81 | 1.23 | |
| D8 | | ● | | ● | | | ● | 0.68 | 1.20 | |
| D9 | | ● | | | | ● | ● | 0.59 | 1.16 | Ratio of REV/D2 : 1.60 |
| D10 | | | | | ● | | ● | 0.48 | 1.22 | |
| REV | ● | | ● | | | ● | | 5.01 | - | |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2016-0028482 filed Mar. 9, 2016, which is incorporated herein by reference in its entirety.

FIELD

The present disclosure relates to an automatic transmission for a vehicle. More particularly, the present disclosure relates to a planetary gear train of an automatic transmission for a vehicle.

BACKGROUND

The statements in this section merely provide background information related to the present disclosure and may not constitute prior art.

Generally, an automatic transmission achieving more speed stages has been developed to enhance fuel economy and optimize drivability.

Such an automatic transmission achieving more speed stages is preferred to maximize power performance and driving efficiency according to downsizing of an engine. Particularly, we have discovered that a high efficiency multiple-speeds transmission having excellent linearity of step ratios can be used as an index closely related to drivability such as acceleration before and after shift and rhythmical engine speed in order to secure competitiveness in the automatic transmission field.

However, in the automatic transmission, as the number of speed stages increase, the number of internal components increase, and as a result, mountability, cost, weight, transmission efficiency, and the like may still deteriorate.

Accordingly, development of a planetary gear train which may achieve maximum efficiency with a small number of components can increase a fuel efficiency enhancement effect through the multiple-speeds.

In this aspect, in recent years, 8-speed automatic transmissions tend to be implemented and the research and development of a planetary gear train capable of implementing more speed stages has also been actively conducted.

However, since a conventional 8-speed automatic transmission has gear ratio span of 6.5-7.5 (gear ratio span is an important factor for securing linearity of step ratios), improvement of power performance and fuel economy may not be very good.

In addition, if an 8-speed automatic transmission has gear ratio span larger than 9.0, it is hard to secure linearity of step ratios. Therefore, driving efficiency of an engine and drivability of a vehicle may be deteriorated.

Further areas of applicability will become apparent from the description provided herein. It should be understood that the description and specific examples are intended for purposes of illustration only and are not intended to limit the scope of the present disclosure.

SUMMARY

The present disclosure has been made in an effort to provide a planetary gear train of an automatic transmission for a vehicle having advantages of improving power delivery performance and fuel economy by achieving at least ten forward speed stages and one reverse speed stage, and widening gear ratio span and of securing linearity of step ratios.

One embodiment of the present disclosure provides a planetary gear train of an automatic transmission for a vehicle having advantages of maintaining durability of pinion shafts by avoiding applying load to planet carriers at stopped states when the vehicle runs at a high speed stage.

A planetary gear train of an automatic transmission for a vehicle according to an embodiment of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft connecting the first rotation element with the fifth rotation element and directly connected to the input shaft; a second shaft connecting the second rotation element with the sixth rotation element; a third shaft connecting the third rotation element with the tenth rotation element; a fourth shaft connected to the fourth rotation element; a fifth shaft connecting the seventh rotation element with the twelfth rotation element; a sixth shaft connected to the eighth rotation element; and a seventh shaft connected to the ninth rotation element and selectively connected to the first shaft, the second shaft, or the third shaft.

The fourth shaft, the fifth shaft, and the sixth shaft may be selectively connected to a transmission housing, and The planetary gear train may further include an eighth shaft connected to the eleventh rotation element, directly connected to the output shaft, and selectively connected to the sixth shaft when the sixth shaft is disconnected from the transmission housing.

The first, second, and third rotation elements of the first planetary gear set may be a first sun gear, a first planet carrier, and a first ring gear, the fourth, fifth, and sixth rotation elements of the second planetary gear set may be a second sun gear, a second planet carrier, and a second ring gear, the seventh, eighth, and ninth rotation elements of the third planetary gear set may be a third sun gear, a third planet carrier, and a third ring gear, and the tenth, eleventh, and twelfth rotation elements of the fourth planetary gear set may be a fourth sun gear, a fourth planet carrier, and a fourth ring gear, respectively.

The first, second, third, and fourth planetary gear sets may be disposed in a sequence of the second planetary gear set, the first planetary gear set, the fourth planetary gear set, and the third planetary gear set from the engine.

The planetary gear train may further include: a first clutch selectively connecting the sixth shaft with the eighth shaft; a second clutch selectively connecting the first shaft with the seventh shaft; a third clutch selectively connecting the second shaft with the seventh shaft; a fourth clutch selectively connecting the third shaft with the seventh shaft; a first brake selectively connecting the fifth shaft with the transmission housing; a second brake selectively connecting the fourth shaft with the transmission housing; and a third brake selectively connecting the sixth shaft with the transmission housing.

A planetary gear train of an automatic transmission for a vehicle according to another embodiment of the present disclosure may include: an input shaft receiving torque of an engine; an output shaft outputting torque; a first planetary gear set including first, second, and third rotation elements; a second planetary gear set including fourth, fifth, and sixth rotation elements; a third planetary gear set including seventh, eighth, and ninth rotation elements; and a fourth planetary gear set including tenth, eleventh, and twelfth rotation elements, wherein the input shaft is directly connected to the first rotation element, the output shaft is directly connected to the eleventh rotation element, the first rotation element is directly connected to the fifth rotation element, the second rotation element is directly connected to the sixth rotation element, the third rotation element is directly connected to the tenth rotation element, the fourth rotation element is directly connected to a transmission housing, the seventh rotation element is directly connected to the twelfth rotation element and is selectively connected to the transmission housing, and the eighth rotation element is selectively connected to the transmission housing.

The eighth rotation element may be selectively connected to the eleventh rotation element in a state of being disconnected from the transmission housing, and the ninth rotation element may be selectively connected to the first rotation element, the second rotation element, or the third rotation element.

The first, second, and third rotation elements of the first planetary gear set may be a first sun gear, a first planet carrier, and a first ring gear, the fourth, fifth, and sixth rotation elements of the second planetary gear set may be a second sun gear, a second planet carrier, and a second ring gear, the seventh, eighth, and ninth rotation elements of the third planetary gear set may be a third sun gear, a third planet carrier, and a third ring gear, and the tenth, eleventh, and twelfth rotation elements of the fourth planetary gear set may be a fourth sun gear, a fourth planet carrier, and a fourth ring gear, respectively.

The first, second, third, and fourth planetary gear sets may be disposed in a sequence of the second planetary gear set, the first planetary gear set, the fourth planetary gear set, and the third planetary gear set from the engine.

The planetary gear train may further include: a first clutch selectively connecting the eighth rotation element with the eleventh rotation element; a second clutch selectively connecting the fifth rotation element with the ninth rotation element; a third clutch selectively connecting the second rotation element with the ninth rotation element; a fourth clutch selectively connecting the third rotation element with the ninth rotation element; a first brake selectively connecting the seventh rotation element with the transmission housing; a second brake selectively connecting the fourth rotation element with the transmission housing; and a third brake selectively connecting the eighth rotation element with the transmission housing.

An embodiment of the present disclosure may achieve at least ten forward speed stages and one reverse speed stage by combining four planetary gear sets being simple planetary gear sets with seven control elements.

In addition, since gear ratio span greater than 10.0 is secured, driving efficiency of the engine may be maximized.

In addition, since linearity of step ratios can be secured due to multiple speed stages, drivability such as acceleration before and after shift, rhythmical engine speed, and the like may be improved.

In addition, durability of pinion shafts connected to pinion gears may be maintained due to smooth lubrication by avoiding applying load to planet carriers at stopped states when the vehicle runs at a high forward speed stage.

DRAWINGS

In order that the disclosure may be well understood, there will now be described various forms thereof, given by way of example, reference being made to the accompanying drawings, in which:

FIG. 2 is an operation chart of control elements at each speed stage in the planetary gear train according to an embodiment of the present disclosure.

Figure 1:
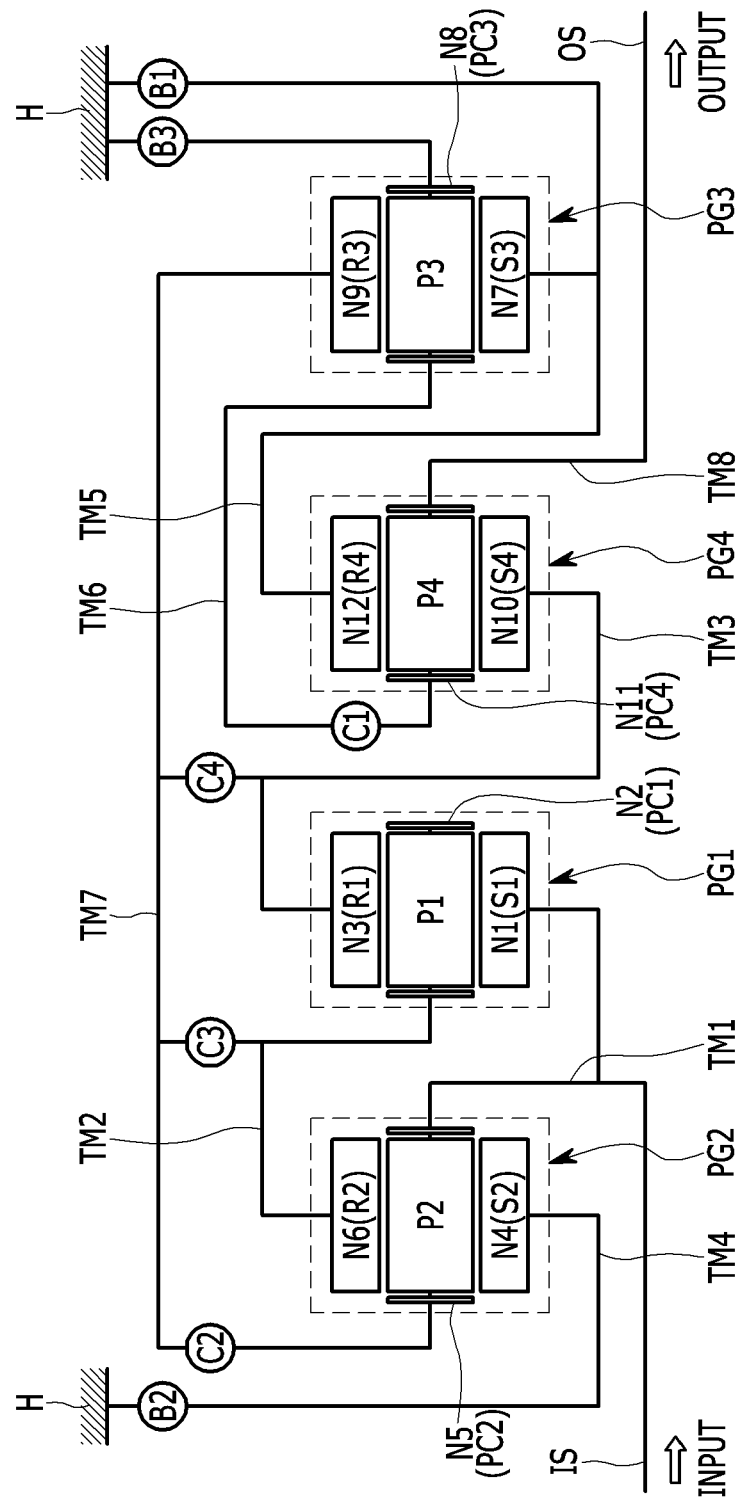
FIG. 1 is a schematic diagram of a planetary gear train according to an embodiment of the present disclosure.

The drawings described herein are for illustration purposes only and are not intended to limit the scope of the present disclosure in any way.

DESCRIPTION OF SYMBOLS

B1, B2, B3: first, second, and third brakes
C1, C2, C3, C4: first, second, third, and fourth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft OS: output shaft
TM1, TM2, TM3, TM4, TM5, TM6, TM7, TM8: first, second, third, fourth, fifth, sixth, seventh, and eighth shafts

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an embodiment of the present disclosure will be described in detail with reference to the accompanying drawings.

However, parts which are not related with the description are omitted for clearly describing the embodiments of the present disclosure and like reference numerals refer to like or similar elements throughout the specification.

In the following description, dividing names of components into first, second, and the like is to divide the names because the names of the components are the same as each other and an order thereof is not particularly limited. As used herein, "connect" and its variants includes connection for transmission of force such as torque, e.g., a first component connected to a second component for rotation therewith, or a first component connected to a second component for fixation of the components, e.g. braking or resisting movement.

FIG. 1 is a schematic diagram of a planetary gear train according to an embodiment of the present disclosure.

Referring to FIG. 1, a planetary gear train according to first embodiment of the present disclosure includes first, second, third, and fourth planetary gear sets PG1, PG2, PG3, and PG4 disposed on the same axis, an input shaft IS, an output shaft OS, eight shafts TM1 to TM8 connected to at least one of rotation elements of the first, second, third, and fourth planetary gear sets PG1, PG2, PG3, and PG4, four clutches C1 to C4 and three brakes B1 to B3 that are control elements, and a transmission housing H.

Torque input from the input shaft IS is changed by cooperation of the first, second, third, and fourth planetary gear sets PG1, PG2, PG3, and PG4, and the changed torque is output through the output shaft OS.

Herein, the planetary gear sets are disposed in a sequence of the second, the first, the fourth, and the third planetary gear sets PG2, PG1, PG4, and PG3 from the engine.

The input shaft IS is an input member and torque from a crankshaft of the engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The first rotation element N1 is directly connected to the fifth rotation element N5, the second rotation element N2 is directly connected to the sixth rotation element N6, the third rotation element N3 is directly connected to the tenth rotation element N10, and the seventh rotation element N7 is directly connected to the twelfth rotation element N12 by four shafts among the eight shafts TM1 to TM8.

The eight shafts TM1 to TM8 will be described in further detail.

The eight shafts TM1 to TM8 directly connect a plurality of rotation elements among the rotation elements of the planetary gear sets PG1, PG2, PG3, and PG4, and are rotation members that are directly connected to any one rotation element (or more) of the planetary gear sets PG1, PG2, PG3, and PG4 and rotate with the any one rotation element to transmit torque, or are fixed members that directly connect any one rotation element of the planetary gear sets PG1, PG2, PG3, and PG4 to the transmission housing H to fix the any one rotation element.

The first shaft TM1 directly connects the first rotation element N1 (first sun gear S1) with the fifth rotation element N5 (second planet carrier PC2) and is directly connected to the input shaft IS.

The second shaft TM2 directly connects the second rotation element N2 (first planet carrier PC1) with the sixth rotation element N6 (second ring gear R2).

The third shaft TM3 directly connects the third rotation element N3 (first ring gear R1) with the tenth rotation element N10 (fourth sun gear S4).

The fourth shaft TM4 is connected to the fourth rotation element N4 (second sun gear S2) and is selectively connected to the transmission housing H.

The fifth shaft TM5 directly connects the seventh rotation element N7 (third sun gear S3) with the twelfth rotation element N12 (fourth ring gear R4) and is selectively connected to the transmission housing H.

The sixth shaft TM6 is connected to the eighth rotation element N8 (third planet carrier PC3) and is selectively connected to the transmission housing H.

The seventh shaft TM7 is connected to the ninth rotation element N9 (third ring gear R3) and is selectively connected to the first, the second, or the third shafts TM1, TM2, or TM3.

The eighth shaft TM8 is connected to the eleventh rotation element N11 (fourth planet carrier PC4), that is selectively connected to the sixth shaft TM6, and is directly connected to the output shaft OS.

In addition, four clutches C1, C2, C3, and C4 are disposed at portions at which any two shafts among the eight shafts TM1 to TM8 including the input shaft IS and the output shaft OS are selectively connected to each other.

In addition, three brakes B1, B2, and B3 are disposed at portions at which any one shaft among the eight shafts TM1 to TM8 is selectively connected to the transmission housing H.

Arrangements of the four clutches C1 to C4 and the three brakes B1 to B3 are described in detail.

The first clutch C1 is disposed between the sixth shaft TM6 and the eighth shaft TM8 and selectively connects the sixth shaft TM6 with the eighth shaft TM8.

The second clutch C2 is disposed between the first shaft TM1 and the seventh shaft TM7 and selectively connects the first shaft TM1 with the seventh shaft TM7.

The third clutch C3 is disposed between the second shaft TM2 and the seventh shaft TM7 and selectively connects the second shaft TM2 with the seventh shaft TM7.

The fourth clutch C4 is disposed between the third shaft TM3 and the seventh shaft TM7 and selectively connects the third shaft TM3 with the seventh shaft TM7.

The first brake B1 is disposed between the fifth shaft TM5 and the transmission housing H and selectively connects the fifth shaft TM5 with the transmission housing H.

The second brake B2 is disposed between the fourth shaft TM4 and the transmission housing H and selectively connects the fourth shaft TM4 with the transmission housing H.

The third brake B3 is disposed between the sixth shaft TM6 and the transmission housing H and selectively connects the sixth shaft TM6 with the transmission housing H.

The control elements including the first, second, third, and fourth clutches C1, C2, C3, and C4 and the first, second, and third brakes B1, B2, and B3 may be multi-plates friction elements of wet type that are operated by hydraulic pressure, although other types of clutches or brakes may also be employed.

FIG. 2 is an operation chart of control elements at each speed stage in the planetary gear train according to an embodiment of the present disclosure.

Referring to FIG. 2, three control elements among the first, second, third, and fourth clutches C1, C2, C3, and C4 and the first, second, and third brakes B1, B2, and B3 that are control elements are operated at each speed stage in the planetary gear train according to the embodiments of the present disclosure. The embodiments of the present disclosure can achieve one reverse speed stage and ten forward speed stages.

The first brake B1 and the second and fourth clutches C2 and C4 are simultaneously operated at a first forward speed stage D1.

In a state that the first shaft TM1 is connected to the seventh shaft TM7 by operation of the second clutch C2 and the third shaft TM3 is connected to the seventh shaft TM7 by operation of the fourth clutch C4, torque of the input shaft IS is input to the first shaft TM1. In addition, the fifth shaft TM5 is operated as the fixed element by operation of the first brake B1. Therefore, the torque of the input shaft IS is shifted into the first forward speed stage, and the first forward speed stage is output to the output shaft OS connected to the eighth shaft TM8.

The first brake B1 and the second and third clutches C2 and C3 are simultaneously operated at a second forward speed stage D2.

In a state that the first shaft TM1 is connected to the seventh shaft TM7 by operation of the second clutch C2 and the second shaft TM2 is connected to the seventh shaft TM7 by operation of the third clutch C3, the torque of the input shaft IS is input to the first shaft TM1. In addition, the fifth shaft TM5 is operated as the fixed element by operation of the first brake B1. Therefore, the torque of the input shaft IS is shifted into the second forward speed stage, and the second forward speed stage is output to the output shaft OS connected to the eighth shaft TM8.

The first and second brakes B1 and B2 and the second clutch C2 are simultaneously operated at a third forward speed stage D3.

In a state that the first shaft TM1 is connected to the seventh shaft TM7 by operation of the second clutch C2, the torque of the input shaft IS is input to the first shaft TM1. In addition, the fifth shaft TM5 and the fourth shaft TM4 are operated as the fixed elements by operation of the first and second brakes B1 and B2. Therefore, the torque of the input shaft IS is shifted into the third forward speed stage, and the third forward speed stage is output to the output shaft OS connected to the eighth shaft TM8.

The first brake B1 and the first and second clutches C1 and C2 are simultaneously operated at a fourth forward speed stage D4.

In a state that the sixth shaft TM6 is connected to the eighth shaft TM8 by operation of the first clutch C1 and the first shaft TM1 is connected to the seventh shaft TM7 by operation of the second clutch C2, the torque of the input shaft IS is input to the first shaft TM1. In addition, the fifth shaft TM5 is operated as the fixed element by operation of the first brake B1. Therefore, the torque of the input shaft IS is shifted into the fourth forward speed stage, and the fourth forward speed stage is output to the output shaft OS connected to the eighth shaft TM8.

The second brake B2 and the first and second clutches C1 and C2 are simultaneously operated at a fifth forward speed stage D5.

In a state that the sixth shaft TM6 is connected to the eighth shaft TM8 by operation of the first clutch C1 and the first shaft TM1 is connected to the seventh shaft TM7 by operation of the second clutch C2, the torque of the input shaft IS is input to the first shaft TM1. In addition, the fourth shaft TM4 is operated as the fixed element by operation of the second brake B2. Therefore, the torque of the input shaft IS is shifted into the fifth forward speed stage, and the fifth forward speed stage is output to the output shaft OS connected to the eighth shaft TM8.

The first, second, and third clutches C1, C2, and C3 are simultaneously operated at a sixth forward speed stage D6.

Since the sixth shaft TM6 is connected to the eighth shaft TM8 by operation of the first clutch C1, the first shaft TM1 is connected to the seventh shaft TM7 by operation of the second clutch C2, and the second shaft TM2 is connected to the seventh shaft TM7 by operation of the third clutch C3, all the planetary gear sets become lock-up states. In this state, the torque of the input shaft IS is input to the first shaft TM1 and the sixth forward speed stage is output to the output shaft OS connected to the eighth shaft TM8. Rotation speed that is the same as rotation speed of the input shaft IS is output at the sixth forward speed stage.

The second brake B2 and the first and third clutches C1 and C3 are simultaneously operated at a seventh forward speed stage D7.

In a state that the sixth shaft TM6 is connected to the eighth shaft TM8 by operation of the first clutch C1 and the second shaft TM2 is connected to the seventh shaft TM7 by operation of the third clutch C3, the torque of the input shaft IS is input to the first shaft TM1. In addition, the fourth shaft TM4 is operated as the fixed element by operation of the second brake B2. Therefore, the torque of the input shaft IS is shifted into the seventh forward speed stage, and the seventh forward speed stage is output to the output shaft OS connected to the eighth shaft TM8.

The second brake B2 and the first and fourth clutches C1 and C4 are simultaneously operated at an eighth forward speed stage D8.

In a state that the sixth shaft TM6 is connected to the eighth shaft TM8 by operation of the first clutch C1 and the third shaft TM3 is connected to the seventh shaft TM7 by operation of the fourth clutch C4, the torque of the input shaft IS is input to the first shaft TM1. In addition, the fourth shaft TM4 is operated as the fixed element by operation of the second brake B2. Therefore, the torque of the input shaft IS is shifted into the eighth forward speed stage, and the eighth forward speed stage is output to the output shaft OS connected to the eighth shaft TM8.

The second brake B2 and the third and fourth clutches C3 and C4 are simultaneously operated at a ninth forward speed stage D9.

In a state that the second shaft TM2 is connected to the seventh shaft TM7 by operation of the third clutch C3 and the third shaft TM3 is connected to the seventh shaft TM7 by operation of the fourth clutch C4, the torque of the input shaft IS is input to the first shaft TM1. In addition, the fourth shaft TM4 is operated as the fixed element by operation of the second brake B2. Therefore, the torque of the input shaft IS is shifted into the ninth forward speed stage, and the ninth forward speed stage is output to the output shaft OS connected to the eighth shaft TM8.

The second brake B2 and the second and fourth clutches C2 and C4 are simultaneously operated at a tenth forward speed stage D10.

In a state that the first shaft TM1 is connected to the seventh shaft TM7 by operation of the second clutch C2 and the third shaft TM3 is connected to the seventh shaft TM7 by operation of the fourth clutch C4, the torque of the input shaft IS is input to the first shaft TM1. In addition, the fourth shaft TM4 is operated as the fixed element by operation of the second brake B2. Therefore, the torque of the input shaft IS is shifted into the tenth forward speed stage, and the tenth forward speed stage is output to the output shaft OS connected to the eighth shaft TM8.

The first and third brakes B1 and B3 and the third clutch C3 are simultaneously operated at a reverse speed stage REV.

In a state that the second shaft TM2 is connected to the seventh shaft TM7 by operation of the third clutch C3, the torque of the input shaft IS is input to the first shaft TM1. In addition, the fifth shaft TM5 and the sixth shaft TM6 are operated as the fixed elements by operation of the first and third brakes B1 and B3. Therefore, the torque of the input shaft IS is shifted into the reverse speed stage, and the reverse speed stage is output to the output shaft OS connected to the eighth shaft TM8.

The planetary gear train according to the embodiments of the present disclosure may achieve at least ten forward speed stage and one reverse speed stage by combining four planetary gear sets PG1, PG2, PG3, and PG4 with the four clutches C1, C2, C3, and C4 and the three brakes B1, B2, and B3.

In addition, since a gear ratio span greater than 10.0 is secured, driving efficiency of the engine may be maximized.

In addition, since linearity of step ratios can be secured due to multiple speed stages, drivability such as acceleration before and after shift, rhythmical engine speed, and so on may be improved.

In addition, durability of pinion shafts connected to pinion gears may be maintained due to smooth lubrication by avoiding applying load to planet carriers at stopped states when the vehicle runs at a high forward speed stage (higher than or equal to the seventh forward speed stage).

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims. The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A planetary gear train of an automatic transmission for a vehicle comprising:
   an input shaft receiving torque of an engine;
   an output shaft outputting torque;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements;
   a first shaft directly connecting the first rotation element with the fifth rotation element and directly connected to the input shaft;
   a second shaft directly connecting the second rotation element with the sixth rotation element;
   a third shaft directly connecting the third rotation element with the tenth rotation element;
   a fourth shaft directly connected to the fourth rotation element;
   a fifth shaft directly connecting the seventh rotation element with the twelfth rotation element;
   a sixth shaft directly connected to the eighth rotation element; and
   a seventh shaft directly connected to the ninth rotation element and selectively connected to the first shaft, the second shaft, and the third shaft.

2. The planetary gear train of claim 1, wherein the fourth shaft, the fifth shaft, and the sixth shaft are each selectively connectable to a transmission housing, and
   wherein the planetary gear train further comprises an eighth shaft connected to the eleventh rotation element, directly connected to the output shaft, and selectively connected to the sixth shaft when the sixth shaft is disconnected from the transmission housing.

3. The planetary gear train of claim 2, further comprising:
   a first clutch selectively connecting the sixth shaft with the eighth shaft;
   a second clutch selectively connecting the first shaft with the seventh shaft;
   a third clutch selectively connecting the second shaft with the seventh shaft;
   a fourth clutch selectively connecting the third shaft with the seventh shaft;
   a first brake selectively connecting the fifth shaft with the transmission housing;
   a second brake selectively connecting the fourth shaft with the transmission housing; and
   a third brake selectively connecting the sixth shaft with the transmission housing.

4. The planetary gear train of claim 1, wherein the first, second, and third rotation elements of the first planetary gear set are a first sun gear, a first planet carrier, and a first ring gear,
   wherein the fourth, fifth, and sixth rotation elements of the second planetary gear set are a second sun gear, a second planet carrier, and a second ring gear,
   wherein the seventh, eighth, and ninth rotation elements of the third planetary gear set are a third sun gear, a third planet carrier, and a third ring gear, and
   wherein the tenth, eleventh, and twelfth rotation elements of the fourth planetary gear set are a fourth sun gear, a fourth planet carrier, and a fourth ring gear, respectively.

5. The planetary gear train of claim 1, wherein the first, second, third, and fourth planetary gear sets are disposed in a sequence of the second planetary gear set, the first planetary gear set, the fourth planetary gear set, and the third planetary gear set from the engine.

6. A planetary gear train of an automatic transmission for a vehicle comprising:
   an input shaft receiving torque of an engine;
   an output shaft outputting torque;
   a first planetary gear set including first, second, and third rotation elements;
   a second planetary gear set including fourth, fifth, and sixth rotation elements;
   a third planetary gear set including seventh, eighth, and ninth rotation elements; and
   a fourth planetary gear set including tenth, eleventh, and twelfth rotation elements,
   wherein the input shaft is directly connected to the first rotation element,
   wherein the output shaft is directly connected to the eleventh rotation element,
   wherein the first rotation element is directly connected to the fifth rotation element,
   wherein the second rotation element is directly connected to the sixth rotation element,
   wherein the third rotation element is directly connected to the tenth rotation element, wherein the fourth rotation element is selectively connectable to a transmission housing, wherein the seventh rotation element is directly connected to the twelfth rotation element and is selectively connected to the transmission housing, and wherein the eighth rotation element is selectively connected to the transmission housing.

7. The planetary gear train of claim 6, wherein the eighth rotation element is selectively connected to the eleventh rotation element in a state of being disconnected from the transmission housing, and wherein the ninth rotation element is selectively connected to the first rotation element, the second rotation element, or the third rotation element.

8. The planetary gear train of claim 7, further comprising:

a first clutch selectively connecting the eighth rotation element with the eleventh rotation element;

a second clutch selectively connecting the fifth rotation element with the ninth rotation element;

a third clutch selectively connecting the second rotation element with the ninth rotation element;

a fourth clutch selectively connecting the third rotation element with the ninth rotation element;

a first brake selectively connecting the seventh rotation element with the transmission housing;

a second brake selectively connecting the fourth rotation element with the transmission housing; and a third brake selectively connecting the eighth rotation element with the transmission housing.

9. The planetary gear train of claim 6, wherein the first, second, and third rotation elements of the first planetary gear set are a first sun gear, a first planet carrier, and a first ring gear, wherein the fourth, fifth, and sixth rotation elements of the second planetary gear set are a second sun gear, a second planet carrier, and a second ring gear, wherein the seventh, eighth, and ninth rotation elements of the third planetary gear set are a third sun gear, a third planet carrier, and a third ring gear, and wherein the tenth, eleventh, and twelfth rotation elements of the fourth planetary gear set are a fourth sun gear, a fourth planet carrier, and a fourth ring gear, respectively.

10. The planetary gear train of claim 6, wherein the first, second, third, and fourth planetary gear sets are disposed in a sequence of the second planetary gear set, the first planetary gear set, the fourth planetary gear set, and the third planetary gear set from the engine.

* * * * *